United States Patent
Moussaoui

(10) Patent No.: US 7,038,432 B2
(45) Date of Patent: May 2, 2006

(54) LINEAR PREDICTIVE CONTROLLER

(75) Inventor: Zaki Moussaoui, Palm Bay, FL (US)

(73) Assignee: Intersil Americas Inc., Milpitas, CA (US)

( * ) Notice: Subject to any disclaimer, the term of this patent is extended or adjusted under 35 U.S.C. 154(b) by 6 days.

(21) Appl. No.: 10/827,200

(22) Filed: Apr. 19, 2004

(65) Prior Publication Data

US 2005/0131557 A1  Jun. 16, 2005

Related U.S. Application Data

(60) Provisional application No. 60/530,034, filed on Dec. 16, 2003.

(51) Int. Cl.
*G05F 1/56* (2006.01)
*G05F 1/44* (2006.01)
*G05F 1/40* (2006.01)
*G05F 1/618* (2006.01)

(52) U.S. Cl. ............... 323/274; 323/284; 363/21.07; 363/21.09; 363/21.1; 363/41; 700/44

(58) Field of Classification Search ............... 700/28, 700/29, 44; 363/21.05, 21.1, 40, 41, 21.07, 363/21.09; 323/222, 284, 322, 274; 123/497
See application file for complete search history.

(56) References Cited

U.S. PATENT DOCUMENTS

| | | | | |
|---|---|---|---|---|
| 4,317,040 A | * | 2/1982 | Wuerflein | 378/110 |
| 5,237,975 A | * | 8/1993 | Betki et al. | 123/497 |
| 5,272,614 A | * | 12/1993 | Brunk et al. | 363/21.05 |
| 5,282,123 A | * | 1/1994 | Boylan et al. | 363/21.1 |
| 5,505,180 A | * | 4/1996 | Otterman et al. | 123/497 |
| 5,953,220 A | * | 9/1999 | Tsai et al. | 363/40 |
| 5,966,002 A | * | 10/1999 | Barrieau et al. | 323/222 |
| 6,427,445 B1 | * | 8/2002 | Isaac et al. | 60/602 |
| 6,593,725 B1 | * | 7/2003 | Gallagher et al. | 323/284 |
| 6,841,983 B1 | * | 1/2005 | Thomas | 323/322 |
| 2005/0110453 A1 | * | 5/2005 | Lecky | |
| 2005/0168198 A1 | * | 8/2005 | Maksimovic et al. | 323/222 |

* cited by examiner

*Primary Examiner*—Anthony Knight
*Assistant Examiner*—Crystal J Barnes
(74) *Attorney, Agent, or Firm*—Meschkow & Greshom, PLC

(57) ABSTRACT

A linear predictive system for a DC—DC converter including a linear predictive controller, first and second adders and a multiplier. The DC—DC converter generates an output signal and includes a digital compensation block that converts a feedback error signal into a main duty cycle signal. The linear predictive controller predicts linear changes of the main duty cycle signal in response to changes of the output signal and provides a predictive duty cycle signal. The first adder subtracts the predictive duty cycle signal from the main duty cycle signal to provide a duty cycle delta. The multiplier multiplies the duty cycle delta by a gain factor to provide a duty cycle delta sample. The second adder adds the duty cycle delta sample to the first duty cycle signal to generate an adjusted duty cycle signal. The linear predictive controller performs an inverse function of DC—DC conversion approximated to the first order

13 Claims, 1 Drawing Sheet

LINEAR PREDICTIVE CONTROLLER

CROSS-REFERENCE TO RELATED APPLICATIONS

Figure 1:
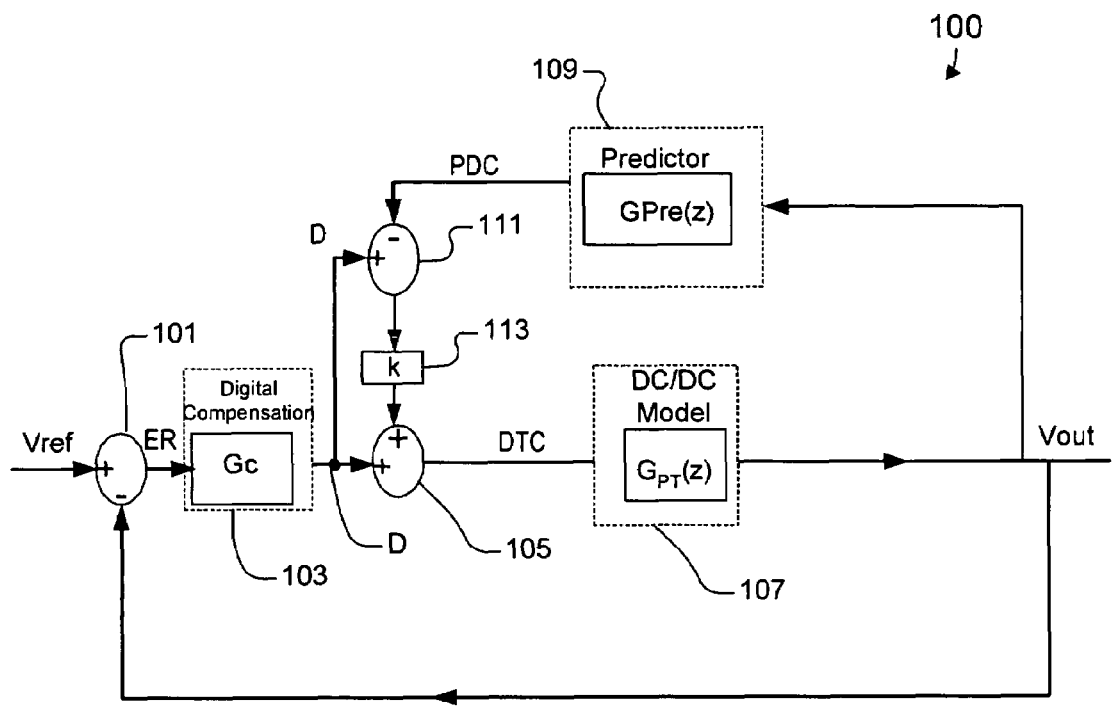

This application claims the benefit of U.S. Provisional Application No. 60/530,034 filed on Dec. 16, 2003, entitled "LINEAR PREDICTIVE CONTROLLER", which is herein incorporated by reference for all intents and purposes.

BACKGROUND OF THE INVENTION

1. Field of the Invention

The present invention relates to DC—DC power converters, and more particularly to a linear predictive controller that allows the use of a high value inductor, at low frequency switching, in order to improve efficiency while keeping the transient at acceptable levels.

2. Description of the Related Art

DC—DC converters generally convert an unregulated DC input voltage to a regulated output voltage. The output voltage or a portion thereof is fed back to a control system that compares the feedback signal with a reference voltage to provide a feedback error signal. A digital compensation block generates a primary or main duty cycle signal based on the feedback error signal. In standard operation, the digital compensation block varies the duty cycle of the main duty cycle signal based on the feedback error signal in an attempt to regulate the output voltage based on the reference signal. The DC—DC converter develops the output signal based on the main duty cycle signal provided from the digital compensation block.

At least one problem with this standard configuration is that the digital compensation block is relatively slow which reduces the regulation efficiency of the output signal. Speed may be increased by increasing bandwidth and response of the basic system at increased cost.

SUMMARY OF THE INVENTION

A linear predictive system for a DC—DC converter according to an embodiment of the present invention includes a linear predictive controller, first and second adders and a multiplier. The DC—DC converter generally operates to generate an output signal based on duty cycle and includes a digital compensation block that converts a feedback error signal into a main duty cycle signal. The linear predictive controller predicts linear changes of the main duty cycle signal in response to changes of the output signal and provides a predictive duty cycle signal indicative thereof. The first adder subtracts the predictive duty cycle signal from the main duty cycle signal to provide a duty cycle delta. The multiplier multiplies the duty cycle delta by a gain factor to provide a duty cycle delta sample. The second adder adds the duty cycle delta sample to the first duty cycle signal to generate an adjusted duty cycle signal.

The gain factor is typically between zero and one and less than one and provided for loop stability. The linear predictive controller may perform an inverse function of the DC—DC converter approximated to the first order.

A DC—DC converter according to an embodiment of the present invention includes a compensation block, a DC—DC block, a linear predictive controller, and first and second combiners. The compensation block converts a feedback error signal into a first duty cycle signal. The first combiner adds a duty cycle delta to the first duty cycle signal to generate an adjusted duty cycle signal. The DC—DC block generates an output signal based on the adjusted duty cycle signal. The linear predictive controller predicts changes of the first duty cycle signal in response to changes of the output signal and provides a predictive duty cycle signal indicative thereof. The second combiner subtracts the predictive duty cycle signal from the first duty cycle signal to provide the duty cycle delta.

The DC—DC converter may include a multiplier that multiplies the duty cycle delta by a loop gain factor to provide a modified duty cycle delta provided to the first combiner. The linear predictive controller may perform an inverse function of the DC—DC block approximated to the first order.

A method of operating a DC—DC power converter according to an embodiment of the present invention includes converting a feedback error signal into a first duty cycle signal, subtracting a duty cycle delta from the first duty cycle signal to provide an adjusted duty cycle signal, generating an output signal based on the adjusted duty cycle signal, linearly predicting changes of duty cycle in response to changes of the output signal to provide a predictive duty cycle, and subtracting the predictive duty cycle from the first duty cycle signal to provide the duty cycle delta. The method may include multiplying the duty cycle delta by a loop gain factor. The method may also include performing an inverse function of the DC—DC converter generating the output signal and approximated to the first order.

BRIEF DESCRIPTION OF THE DRAWING(S)

The benefits, features, and advantages of the present invention will become better understood with regard to the following description, and accompanying drawing in which:

FIG. 1 is a block diagram of a power system with a linear predictive controller according to an exemplary embodiment of the present invention.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

A linear predictive controller according to an embodiment of the present invention allows the use of a high value inductor at low frequency switching, which improves efficiency while keeping the transient at acceptable levels. The present invention provides the ability to have very fast settling time without an increase in bandwidth.

FIG. 1 is a block diagram of a PWM power system 100 with a linear predictive controller according to an exemplary embodiment of the present invention. A standard loop includes a combiner 101 (e.g., adder) having a positive input receiving a reference voltage VREF and a negative input receiving an output signal VOUT. The combiner 101 subtracts VOUT from VREF to generate a feedback error signal ER, which is provided to an input of a digital compensation block 103. The digital compensation block 103 receives the ER signal and generates a duty cycle signal D at its output. Ignoring the combiner 105, the duty cycle D is provided to an input of a DC—DC converter represented as the DC—DC model block 107. The DC—DC model block 107 receives the D signal (or a version thereof) and generates the VOUT signal based on the D signal. The transfer functions of the digital compensation block 103 and the DC—DC model block 107 are Gc and $G_{PT}(z)$, respectively.

In one exemplary embodiment, the D duty cycle signal has a duty cycle determined by the digital compensation block 103 to regulate VOUT based on VREF. In standard operation, the digital compensation block 103 generates the D signal with a duty cycle based on the ER signal in an attempt to regulate VOUT based on VREF. The DC—DC model block 107 develops the VOUT signal based on the duty cycle of the D signal, and the VOUT signal is fed back to the negative input of the combiner 101 to complete the primary or main conversion loop. At least one problem with the standard configuration is that the digital compensation block 103 is relatively slow which reduces the regulation efficiency of VOUT. Speed may be increased by increasing bandwidth and response of the basic system at increased cost.

A predictor block 109 with a transfer function GPre(z) is added having an input receiving the VOUT signal and an output providing a predictive duty cycle signal PDC, which is provided to an negative input of another combiner 111. The combiner 111 has a positive input coupled to the output of the digital compensation block 103 for receiving the D signal. The output of the combiner 111 is provided to a multiplier or gain block 113 with constant gain factor k, having an output provided to one positive input of another combiner 105. The D signal is provided instead to the positive input of the combiner 105, which adds the output of gain block 113 with the D signal to develop an adjusted duty cycle signal DTC provided to the DC—DC model block 107.

The transfer function GPre(z) of the predictor block 109 is the equivalent of $1/G_{PT}(z)$ approximated to the first order, where $1/G_{PT}(z)$ is the transfer function of the DC—DC model block 107. The predictor block 109 thus performs a quick and simplified version of the inverse function of the DC—DC model block 107, and thus predicts the duty cycle that would be necessary to generate the actual VOUT signal. Note that the input of the DC—DC model block 107 is a duty cycle and its output is the output voltage VOUT, whereas the input of the predictor block 109 is the output voltage VOUT and its output is the predictive duty cycle PDC. Since the inverse function is approximated to the first order, it is performed very quickly and predicts loop response significantly faster than the main loop. The PDC is subtracted from D providing a duty cycle differential or duty cycle delta that represents an error of the D signal. PDC is subtracted from D for negative feedback so that, theoretically, the negative duty cycle delta added back into the loop should correct the error. The duty cycle delta is multiplied by the gain factor k by the gain block 113 for loop stability, and the result is added to the D signal for loop correction.

Assuming a duty cycle of "D" of the D signal with the output at VOUT=V at time t=0, the output of the predictor block 109 should also be at the same duty cycle "D". If, however, the voltage of VOUT increases to VOUT+v, where "v" represents an incremental voltage change of VOUT, then the output of the predictor block 109, initially at "D" is D+"d", where "d" represents an incremental change at the output of the predictor block 109 in response to the incremental change of VOUT. The output of the slow digital compensation block 103, however, is still at a duty cycle of D. The combiner 111 subtracts D+d from D resulting in the negative duty cycle delta "−d", which is multiplied by the gain factor k to provide −kd to the combiner 105. The combiner 105 adds the result −kd to D to modify the duty cycle of the DTC signal to D−kd. In this manner, the predictor block 109 responds much faster than the digital compensation block 103 to predict the change of duty cycle in response to output changes to more tightly regulate the VOUT signal.

The predictor block 109 provides a faster feedback loop to anticipate the desired duty cycle and to modify the duty cycle towards the correct value faster than the slow digital compensation block 103. The gain factor "k" is chosen for loop stability and is between 0 and 1 and is typically less than 1. The predictor block 109 has a linear response since it ignores higher order factors and thus is potentially less accurate for larger changes of duty cycle. Directly subtracting the duty cycle delta might otherwise lead to instability of VOUT. Instead, the gain factor k samples only a portion of the anticipated change in duty cycle to be added in the loop significantly reducing error of the linear prediction. The DTC signal is compensated by the linear predictor block 109 for faster response so that the power system 100 settles faster into the new steady state in response to changes in VOUT.

Implementations using a digital controller or an analogue controller are contemplated.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention.

The invention claimed is:

1. A linear predictive system for a DC—DC converter, wherein said DC—DC converter is configured to generate an output signal based on duty cycle, and wherein said DC—DC converter includes a digital compensation, block configured to convert a feedback error signal into a main duty cycle signal in a first feedback loop, said linear predictive system comprising:
    a linear predictive controller configured to predict linear changes of said main duty cycle signal in response to changes in said output signal, and configured to produce a predictive duty cycle signal from said output signal in a second feedback loop, wherein said predictive duty cycle signal is indicative of said linear changes;
    a first combiner configured to subtract said predictive duty cycle signal from said main duty cycle signal to produce a duty cycle delta;
    a multiplier configured to multiply said duty cycle delta by a gain factor to produce a duty cycle delta sample; and
    a second combiner configured to add said duty cycle, delta sample to said first duty cycle signal to generate an adjusted duty cycle signal.

2. A linear predictive system as claimed in claim 1, wherein said gain factor is less than one.

3. A linear predictive system as claimed in claim 1, wherein said linear predictive controller is configured to perform an inverse function of said DC—DC converter approximated to a first order.

4. A DC—DC converter, comprising:
    a DC—DC block configured to produce an output signal in response to an adjusted duty cycle signal;

a compensation block coupled to said DC—DC block in a first feedback loop, and configured to produce a duty cycle signal in response to said output signal;

a linear predictive controller coupled to said DC—DC block in a second feedback loop, and configured to produce a predictive duty cycle signal in response to changes in said output signal; and a first combiner coupled to said compensation block, coupled to said linear predictive controller, coupled to said DC—DC block, and configured to produce said adjusted duty cycle signal in response to said duty cycle signal and said predictive duty cycle signal.

5. A DC—DC converter as claimed in claim 4 wherein:

said linear predictive controller is configured to produce said predictive duty cycle signal from said output signal, wherein said predictive duty cycle signal is indicative of said changes of said output signal;

said DC—DC converter additionally comprises a second combiner coupled to said linear predictive controller and configured to subtract said predictive duty cycle signal from said first duty cycle signal to produce a duty cycle delta; and said first combiner is configured to produce said adjusted duty cycle signal in response to said duty cycle signal and said duty cycle delta.

6. A DC—DC converter as claimed in claim 5, further comprising a multiplier coupled to said second combiner, coupled to said first combiner, and configured to multiply said duty cycle delta by a loop gain factor to produce a modified duty cycle delta;

said first combiner is configured to add said modified duty cycle delta from said duty cycle signal to produce said adjusted duty cycle signal.

7. A DC—DC converter as claimed in claim 6, wherein said loop gain factor is between 0 and 1.

8. A DC—DC converter as claimed in claim 4, wherein:

said DC—DC converter additionally comprises a second combiner coupled to said DC—DC block, coupled to said compensation block, and configured to subtract said output signal from a reference signal to generate said feedback error signal; and said compensation block is configured to convert said feedback error signal into said duty cycle signal.

9. A DC—DC converter as claimed in claim 4, wherein said linear predictive controller is configured to perform an inverse function of said DC—DC block approximated to a first order.

10. A method of operating a DC—DC power converter, comprising:

converting a feedback error signal into a first duty cycle signal in a first feedback loop;

subtracting a duty cycle delta from said first duty cycle signal to produce an adjusted duty cycle signal;

generating an output signal in response to said adjusted duty cycle signal;

linearly predicting changes of duty cycle in response to changes of said output signal to produce a predictive duty cycle in a second feedback loop; and subtracting said predictive duty cycle from said first duty cycle signal to produce said duty cycle delta.

11. A method as claimed in claim 10, wherein said linearly predicting activity comprises performing an inverse function of said generating activity approximated to a first order.

12. A method as claimed in claim 10, further comprising subtracting said output signal from a reference signal to produce said feedback error signal.

13. A method as claimed in claim 10, further comprising multiplying said duty cycle delta by a loop gain factor.

* * * * *